US009605823B2

(12) United States Patent
Barham

(10) Patent No.: US 9,605,823 B2
(45) Date of Patent: Mar. 28, 2017

(54) LIGHTING APPARATUS

(71) Applicant: Bruce Alexander Barham, Calgary (CA)

(72) Inventor: Bruce Alexander Barham, Calgary (CA)

( * ) Notice: Subject to any disclaimer, the term of this patent is extended or adjusted under 35 U.S.C. 154(b) by 90 days.

(21) Appl. No.: 14/743,575

(22) Filed: Jun. 18, 2015

(65) Prior Publication Data

US 2016/0369961 A1 Dec. 22, 2016

(51) Int. Cl.
*G03B 21/20* (2006.01)
*F21S 10/00* (2006.01)
*F21S 4/28* (2016.01)
*F21V 23/00* (2015.01)
*F21V 14/06* (2006.01)
(Continued)

(52) U.S. Cl.
CPC ............ *F21S 10/007* (2013.01); *F21S 4/28* (2016.01); *F21S 10/023* (2013.01); *F21V 5/008* (2013.01); *F21V 5/04* (2013.01); *F21V 14/06* (2013.01); *F21V 23/003* (2013.01); *F21V 23/02* (2013.01); *G03B 21/2053* (2013.01); *F21V 13/02* (2013.01); *F21V 14/08* (2013.01); *F21W 2121/00* (2013.01); *F21Y 2103/003* (2013.01); *F21Y 2103/10* (2016.08); *F21Y 2113/13* (2016.08); *F21Y 2115/10* (2016.08)

(58) Field of Classification Search
CPC ...... G03B 21/00; G03B 37/04; G03B 21/208; G03B 21/2053; F21S 10/007; F21V 14/08; F21V 14/006
USPC ............ 353/62, 88, 97, 122, 43, 42, 80, 120
See application file for complete search history.

(56) References Cited

U.S. PATENT DOCUMENTS 4,893,540 A * 1/1990 Friedmar ............ G09B 21/008
353/74
5,517,264 A 5/1996 Sutton
(Continued)

FOREIGN PATENT DOCUMENTS

CN 202091940 12/2011
CN 202122839 1/2012
(Continued)

OTHER PUBLICATIONS

Samborski, ISR and WOSA for PCT/CA2016/050467 Jun. 20, 2016.

*Primary Examiner* — William C Dowling
*Assistant Examiner* — Ryan Howard
(74) *Attorney, Agent, or Firm* — Giuseppe Mariconda

(57) ABSTRACT

A lighting apparatus is for use with a projection-receiving surface. The lighting apparatus includes a light-filtering assembly configured to block transmission of a first amount of light emitted by a light source towards the projection-receiving surface. This is done in such a way that blocked transmission of the first amount of light forms a projected shadow region on the projection-receiving surface. The light-filtering assembly is also configured to permit transmission of a second amount of light emitted by the light source towards the projection-receiving surface. This is done in such a way that transmission of the second amount of light forms a projected glow region on the projection-receiving surface. A filter-moving assembly is configured to move the light-filtering assembly. This is done in such a way that the projected shadow region and the projected glow region move and combine to form a variable curved wave pattern.

20 Claims, 6 Drawing Sheets

(51) Int. Cl.
*F21V 5/00* (2015.01)
*F21V 5/04* (2006.01)
*F21V 23/02* (2006.01)
*F21S 10/02* (2006.01)
*F21V 14/08* (2006.01)
*F21V 13/02* (2006.01)
*F21Y 103/00* (2016.01)
*F21W 121/00* (2006.01)
*F21Y 103/10* (2016.01)
*F21Y 115/10* (2016.01)
*F21Y 113/13* (2016.01)

(56) References Cited

U.S. PATENT DOCUMENTS

| | | | |
|---|---|---|---|
| 5,934,223 A | 8/1999 | Ellery-Guy | |
| 6,267,478 B1 | 7/2001 | Chen | |
| 6,357,893 B1 | 3/2002 | Belliveau | |
| 7,033,028 B1 | 4/2006 | Belliveau | |
| 7,056,006 B2 | 6/2006 | Smith | |
| 7,088,321 B1* | 8/2006 | Parker | G09G 3/3406 345/211 |
| 7,871,192 B2 | 1/2011 | Chien | |
| 8,684,557 B2 | 4/2014 | Totani | |
| 8,721,160 B2 | 5/2014 | Chien | |
| 2003/0035092 A1 | 2/2003 | Bramlett et al. | |
| 2007/0263393 A1 | 11/2007 | Van De Ven | |
| 2008/0143970 A1 | 6/2008 | Harbers et al. | |
| 2012/0121244 A1 | 5/2012 | Stavely | |
| 2013/0094219 A1* | 4/2013 | Jurik | F21S 10/007 362/322 |
| 2013/0194796 A1 | 8/2013 | Progl | |
| 2013/0208479 A1* | 8/2013 | Allan | F21S 10/007 362/271 |
| 2014/0111985 A1 | 4/2014 | Harbers | |
| 2014/0198949 A1 | 7/2014 | Garlington et al. | |
| 2014/0268882 A1 | 9/2014 | Hoang | |

FOREIGN PATENT DOCUMENTS

| | | |
|---|---|---|
| CN | 202719470 | 2/2013 |
| JP | 10223039 | 8/1998 |
| WO | 2009093191 | 7/2009 |

* cited by examiner

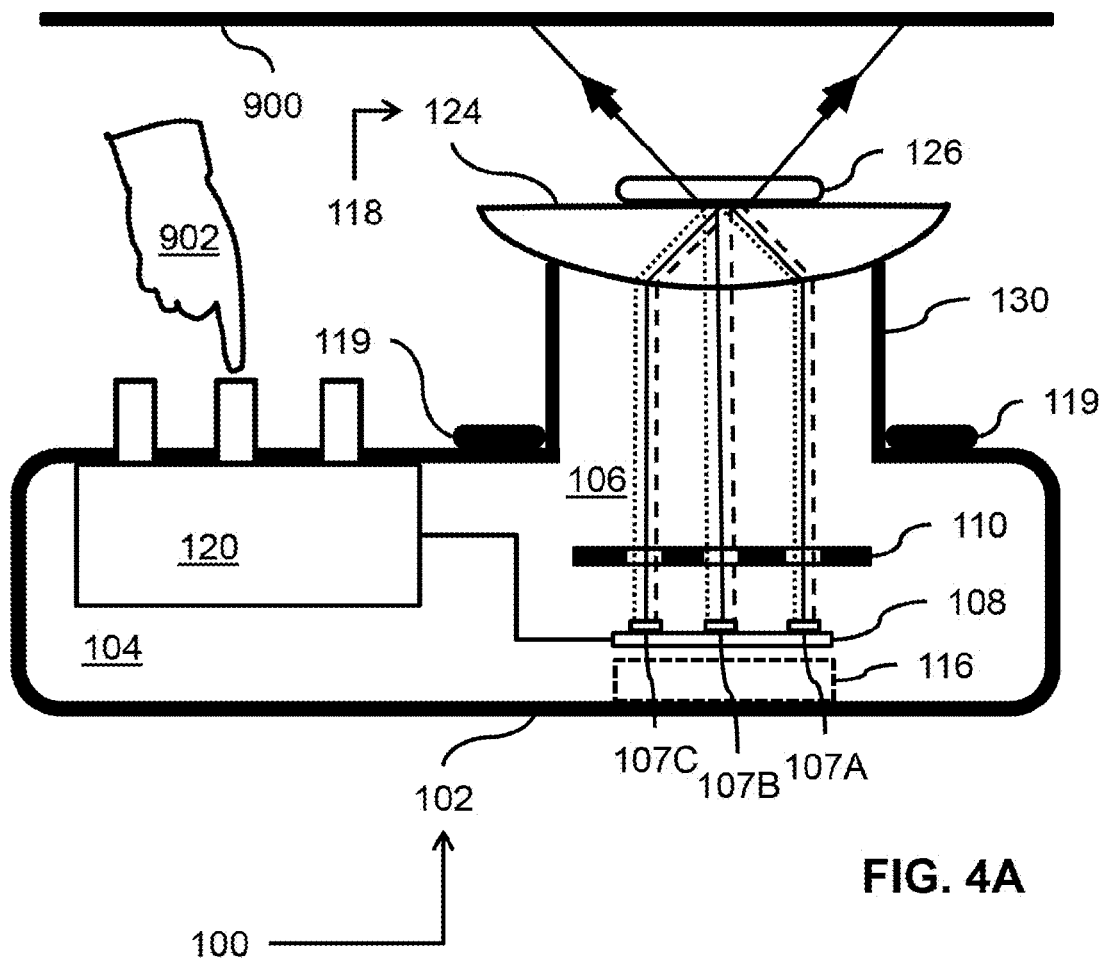

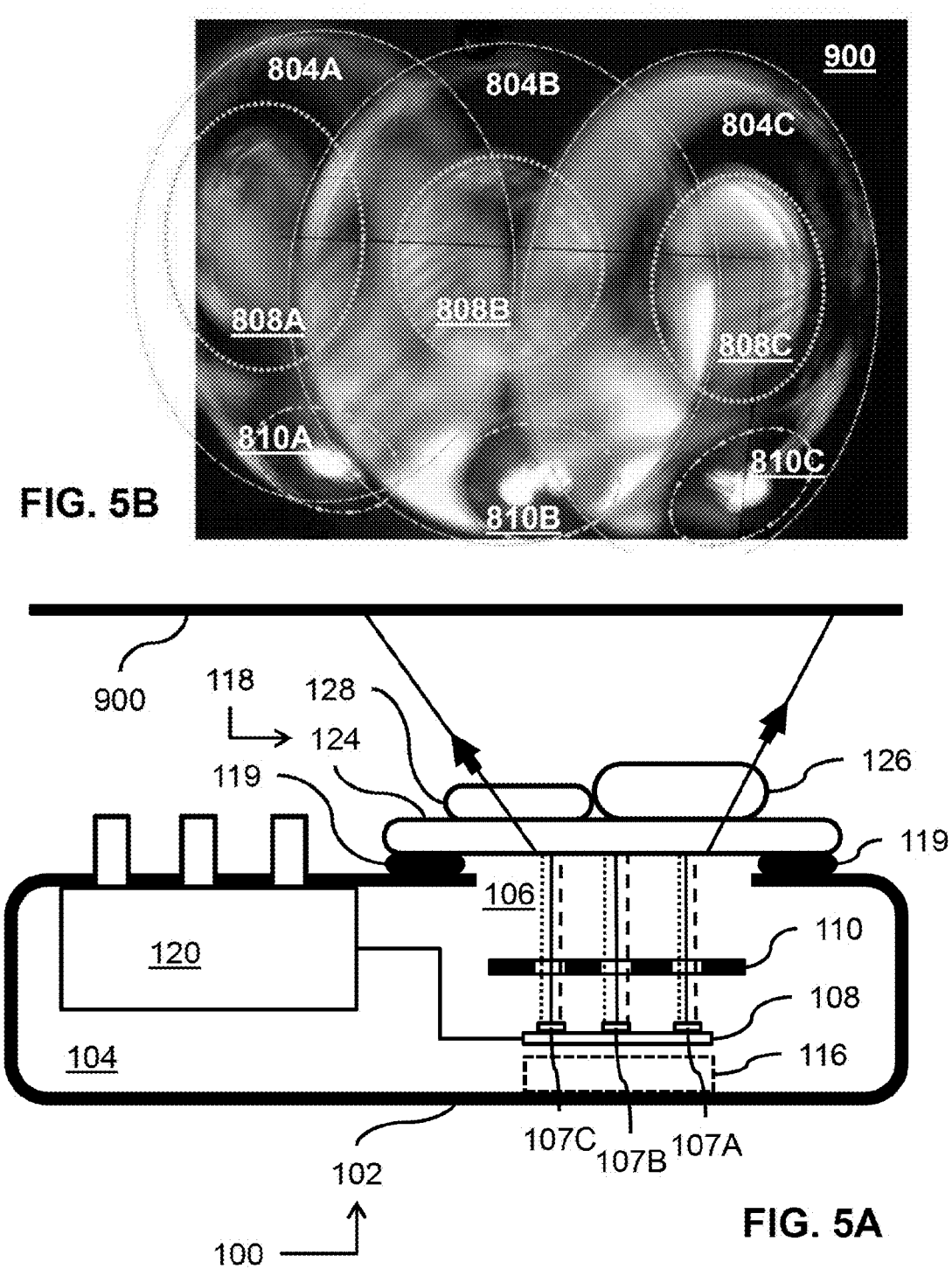

LIGHTING APPARATUS

TECHNICAL FIELD

This document relates to the technical field of (and is not limited to) a lighting apparatus.

BACKGROUND

Lighting or illumination is the deliberate use of light to achieve a practical or aesthetic effect. Lighting includes the use of both artificial light sources like lamps and light fixtures, as well as natural illumination by capturing daylight. Proper lighting can enhance task performance, improve the appearance of an area, or have positive psychological effects on occupants.

SUMMARY

It will be appreciated that there exists a need to mitigate (at least in part) at least one problem associated with the existing lighting systems (also called the existing technology). After much study of the known systems and methods with experimentation, an understanding of the problem and its solution has been identified and is articulated as follows:

What is needed is a lighting apparatus that provides an entertaining and/or educational light show.

To mitigate, at least in part, at least one problem associated with the existing technology, there is provided (in accordance with a major aspect) a lighting apparatus. The lighting apparatus is for use with a projection-receiving surface. The lighting apparatus includes, and is not limited to, a synergistic combination of a housing assembly, a light source, a light-filtering assembly, and a filter-moving assembly. The housing assembly forms an interior housing chamber. The housing assembly also forms a projection opening leading to the interior housing chamber. The projection opening is configured to face the projection-receiving surface (once the housing assembly is positioned to do just so). The light-filtering assembly is positioned in the interior housing chamber of the housing assembly between the projection opening and the light source. The filter-moving assembly is positioned in the interior housing chamber of the housing assembly. The filter-moving assembly is coupled to the light-filtering assembly. The filter-moving assembly is configured to move the light-filtering assembly. The light source is positioned in the interior housing chamber of the housing assembly. The light source is configured to emit light through the projection opening of the housing assembly toward the projection-receiving surface (once the light source is positioned and activated to do just so). The light-filtering assembly is configured to block the transmission of a first amount of light being emitted by the light source through the projection opening towards the projection-receiving surface in such a way that the blocked transmission of the first amount of light being emitted by the light source (in use) forms a projected shadow region positioned on the projection-receiving surface. The light-filtering assembly is also configured to permit the transmission of a second amount of light being emitted by the light source through the projection opening towards the projection-receiving surface in such a way that the transmission of the second amount of light being emitted by the light source (in use) forms a projected glow region positioned on the projection-receiving surface. The filter-moving assembly is configured to move the light-filtering assembly. This is done in such a way that the projected shadow region and the projected glow region positioned on the projection-receiving surface move and combine to form a variable curved wave patterns while the light-filtering assembly is moved just so.

Other aspects are identified in the claims.

Other aspects and features of the non-limiting embodiments may now become apparent to those skilled in the art upon review of the following detailed description of the non-limiting embodiments with the accompanying drawings.

BRIEF DESCRIPTION OF THE DRAWINGS

The non-limiting embodiments may be more fully appreciated by reference to the following detailed description of the non-limiting embodiments when taken in conjunction with the accompanying drawings, in which:

FIG. 4A (SHEET 4 of 6 SHEETS) depicts a schematic view of an embodiment of the lighting apparatus of FIG. 1;

FIG. 4B (SHEET 4 of 6 SHEETS) depicts a schematic view of an embodiment of a projected shadow region and an embodiment of a projected glow region formed by the lighting apparatus of FIG. 1;

FIG. 5A (SHEET 5 of 6 SHEETS) depicts a schematic view of an embodiment of the lighting apparatus of FIG. 1;

FIG. 5B (SHEET 5 of 6 SHEETS) depicts a schematic view of an embodiment of a projected shadow region and an embodiment of a projected glow region formed by the lighting apparatus of FIG. 1;

Figure 1:
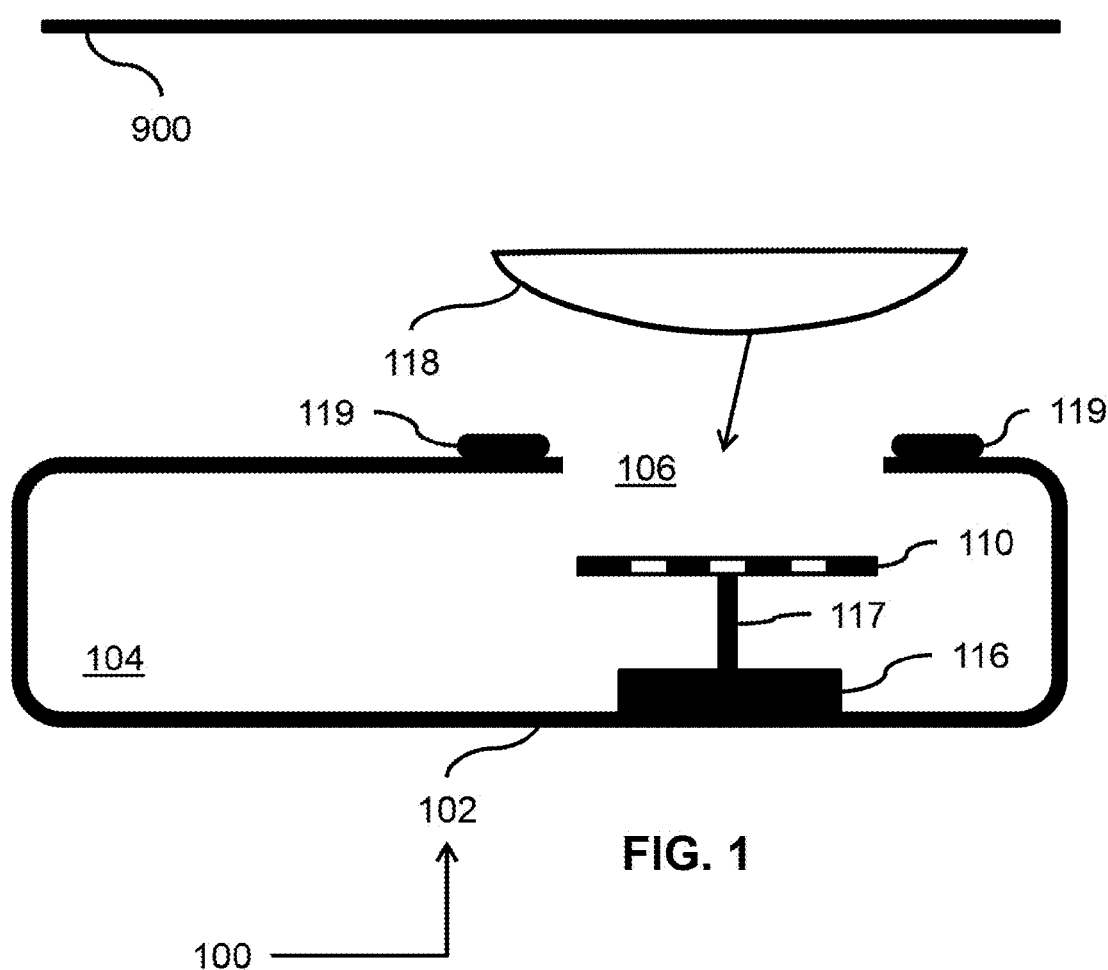
FIG. 1 (SHEET 1 of 6 SHEETS) depicts a schematic view of an embodiment of a lighting apparatus.

The drawings are not necessarily to scale and may be illustrated by phantom lines, diagrammatic representations and fragmentary views. In certain instances, details unnecessary for an understanding of the embodiments (and/or details that render other details difficult to perceive) may have been omitted.

Corresponding reference characters indicate corresponding components throughout the several figures of the drawings. Elements in the several figures are illustrated for simplicity and clarity and have not been drawn to scale. The dimensions of some of the elements in the figures may be emphasized relative to other elements for facilitating an understanding of the various disclosed embodiments. In addition, common, but well-understood, elements that are useful or necessary in commercially feasible embodiments are often not depicted to provide a less obstructed view of the embodiments of the present disclosure.

LISTING OF REFERENCE NUMERALS USED IN THE DRAWINGS

100 lighting apparatus
102 housing assembly 104 interior housing chamber
106 projection opening
107A first light emitting diode
107B second light emitting diode
107C third light emitting diode
108 light source
109 LED strip, light emitting diode strip
110 light-filtering assembly
111 centrally positioned hole
112 projected shadow region
114 projected glow region
115 rotatable mechanism
116 filter-moving assembly
117 rotatable shaft
118 lens assembly
119 lens-support device
120 light controller
121A first potentiometer
121B second potentiometer
121C third potentiometer
122 control wire
124 first lens
126 second lens
128 third lens
130 lens-positioning adjustment device
800 projected image
802 background shadow image
804A first orb image
804B second orb image
804C third orb image
808A fourth orb image
808B fifth orb image
808C sixth orb image
810A seventh orb image
810B eighth orb image
810C ninth orb image
900 projection-receiving surface
902 user

DETAILED DESCRIPTION OF THE
NON-LIMITING EMBODIMENT(S)

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope of the invention is defined by the claims. For the description, the terms "upper," "lower," "left," "rear," "right," "front," "vertical," "horizontal," and derivatives thereof shall relate to the examples as oriented in the drawings. There is no intention to be bound by any expressed or implied theory in the preceding Technical Field, Background, Summary or the following detailed description. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise.

It is understood that the phrase "at least one" is equivalent to "a". The aspects (examples, alterations, modifications, options, variations, embodiments and any equivalent thereof) are described regarding the drawings. It should be understood that the invention is limited to the subject matter provided by the claims, and that the invention is not limited to the particular aspects depicted and described.

FIG. 1 depicts a schematic view of an embodiment of a lighting apparatus 100.

The lighting apparatus 100 is for use with a projection-receiving surface 900. In accordance with an option, the projection-receiving surface 900 includes a ceiling surface of a room.

Figures 3A, 3B, 3C:
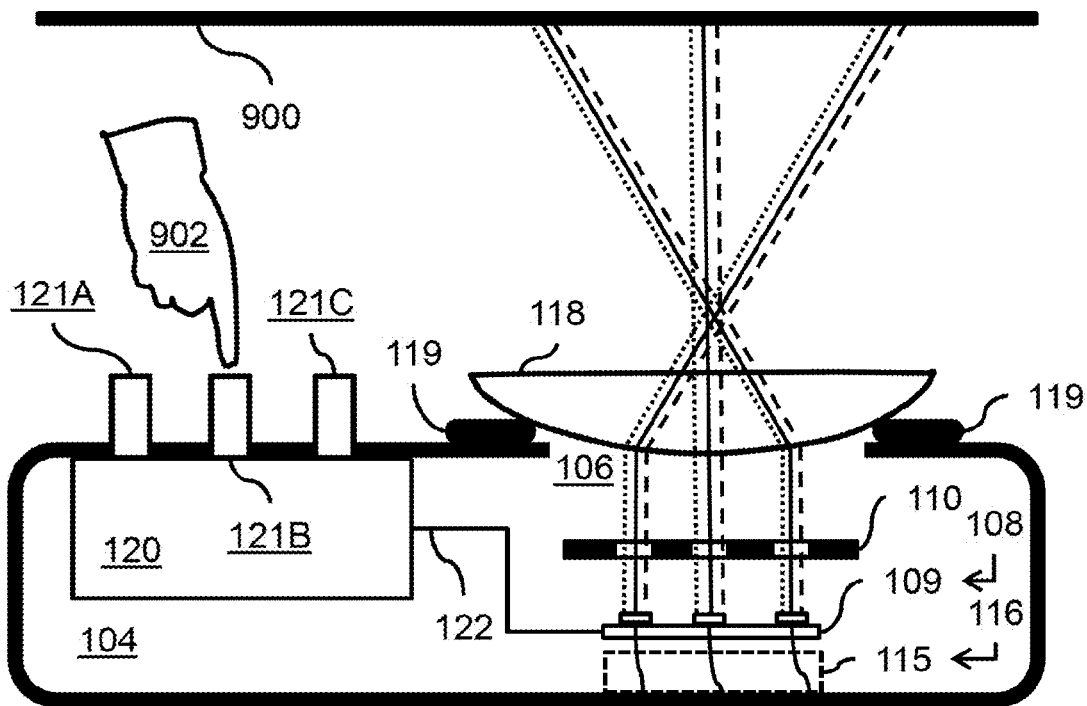
FIG. 3A (SHEET 3 of 6 SHEETS) depicts a schematic view of an embodiment of the lighting apparatus of FIG. 1.
FIG. 3B and FIG. 3C (SHEET 3 of 6 SHEETS) depict schematic views of an embodiment of a projected shadow region and an embodiment of a projected glow region formed by the lighting apparatus of FIG. 1.

The lighting apparatus 100 includes (and is not limited to) a synergistic combination of a housing assembly 102 (an embodiment of which is depicted in FIG. 1), a light source 108 (an embodiment of which is depicted in FIG. 3A), a light-filtering assembly 110 (an embodiment of which is depicted in FIG. 1), and a filter-moving assembly 116 (an embodiment of which is depicted in FIG. 1).

The housing assembly 102 forms an interior housing chamber 104. The housing assembly 102 also forms a projection opening 106 leading to the interior housing chamber 104. The projection opening 106 is configured to face the projection-receiving surface 900 (once the housing assembly 102 is positioned to do just so).

In accordance with the depicted embodiment, the light-filtering assembly 110 is positioned in the interior housing chamber 104 of the housing assembly 102 between the projection opening 106 and the light source 108 (as depicted in FIG. 3A). The light-filtering assembly 110 may be called a gobo.

The filter-moving assembly 116 is positioned in the interior housing chamber 104 of the housing assembly 102. The filter-moving assembly 116 is coupled to the light-filtering assembly 110. The filter-moving assembly 116 is configured to move (such as, rotate or linearly translate, etc.) the light-filtering assembly 110. The light-filtering assembly 110 and the filter-moving assembly 116 cooperate (in use) to manipulate a shape of emitted light that is to be projected (casted) on the projection-receiving surface 900.

Figure 2:
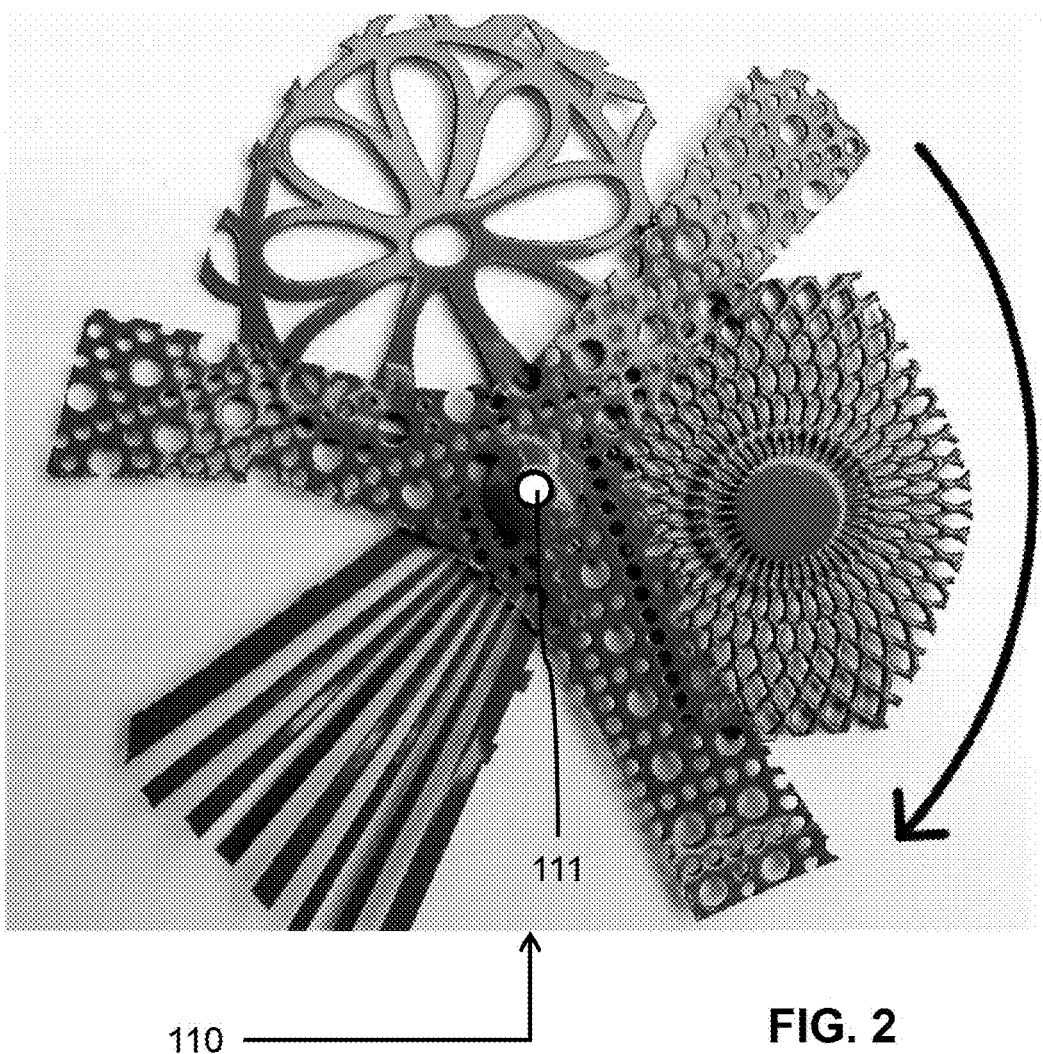
FIG. 2 (SHEET 2 of 6 SHEETS) depicts a plan view of an embodiment of a light-filtering assembly of the lighting apparatus of FIG. 1.

In accordance with the embodiment as depicted in FIG. 2, the filter-moving assembly 116 includes a rotatable shaft 117 that is fixedly attached to the light-filtering assembly 110.

In accordance with an embodiment, the filter-moving assembly 116 includes any type of moving mechanism configured to rotate (move) the light-filtering assembly 110. It will be appreciated that the rotatable shaft 117 is not depicted in FIGS. 3A, 4, 5A, 6A and 7A (for convenience) depicts of other technical features associated with the lighting apparatus 100. A technical effect associated with the filter-moving assembly 116 (moving mechanism) once energized (and remains energized just so), moves the light-filtering assembly 110 in a continuous (smooth) motion. More specifically, the filter-moving assembly 116 includes a continuous-motion mechanism configured for quiet operation (which provides an advantage for the case where the lighting apparatus 100 is deployed in a quiet environment, such as the bedroom).

In accordance with an embodiment, the lighting apparatus 100 further includes a lens assembly 118. The lens assembly 118 is configured to be positioned relative to the projection opening 106 of the housing assembly 102. The lens assembly 118 is configured to concentrate or disperse light rays, and may include one lens or several lenses. The lens assembly 118 is configured to focus or otherwise modify the direction of movement of the light. It will be appreciated that the lens assembly 118 is optional. The lens assembly 118 may include, for instance, a transparent material (at least one or more transparent materials having glass material and/or a plastic material), a translucent material (at least one or more translucent materials, such as a crystal material) and/or a stencil pattern (at least one or more stencil patterns), and any combination and/or permutation thereof. The lens assembly 118 may include translucent materials of variable refractive index. In accordance with an embodiment, the lighting apparatus 100 further includes a lens-support device 119 positioned on the housing assembly 102 proximate to the projection opening 106. The lens-support device 119 is configured to support the lens assembly 118 relative to the projection opening 106.

FIG. 2 depicts a plan view of an embodiment of the light-filtering assembly 110 of the lighting apparatus 100 of FIG. 1.

In accordance with the embodiment as depicted in FIG. 2, the light-filtering assembly 110 includes a physical stencil and/or a slotted template, which may include a plastic material or a metal material, etc., or any equivalent thereof. For instance, the light-filtering assembly 110 may include a piece of metal forming patterned holes through which some light passes and some light is blocked (that is, from passing through). The light-filtering assembly 110 defines (provides) a centrally positioned hole 111 configured to operatively receive the rotatable shaft 117 (depicted in FIG. 1). The light-filtering assembly 110 provides a set of randomly positioned holes that are spaced apart from each other, and that allow the passage of some emitted light therethrough while blocking the passage of some emitted light.

FIG. 3A depicts a schematic view of an embodiment of the lighting apparatus 100 of FIG. 1.

The light-filtering assembly 110 is positioned in the interior housing chamber 104 of the housing assembly 102 between the projection opening 106 and the light source 108. The light source 108 is positioned in the interior housing chamber 104 of the housing assembly 102. The light source 108 is configured to emit (transmit) light through the projection opening 106 of the housing assembly 102 toward the projection-receiving surface 900 (once the light source 108 is positioned and activated to do just so).

In accordance with the embodiment as depicted in FIG. 3A, the light-filtering assembly 110 is positioned between the lens assembly 118 and the light source 108. In accordance with an embodiment, the lens assembly 118 is positioned between the light-filtering assembly 110 and the light source 108 (if so desired, for additional visual display effects, etc.).

In accordance with an option, water (a fluid or liquid) may be used with the lighting apparatus 100. For instance, water may be placed in a round bottomed bowl in such a way as to form the lens assembly 118. It will be appreciated that a liquid-like wave effect (in the display image) may be generated with an entirely solid lens material (if so desired). It will be appreciate that a liquid-like interference may be displayed (resolved) without the lens assembly 118. It will be appreciated that the descriptors that refer directly to "liquid-like wave" does not imply that a liquid was (or must be) used as part of the lend 118. It will be appreciated that for the case where water (a liquid) is use as part of the lens assembly 118, care should be used to enhance safety and avoid unintended injury by using the a liquid with the lighting apparatus 100 (such as, to avoid the possibility of a inducing a short circuit, etc.). For this case, the lighting apparatus 100 may be water proofed.

Once the light-filtering assembly 110 is placed in the beam of light (that is, the light that is transmitted by the light source 108), the light-filtering assembly 110 casts (in use) a desired shape or pattern of light (a glow zone) onto the projection-receiving surface 900 (as depicted in FIG. 3B and/or FIG. 3C), while blocking the transmission of some of the light (from the light source 108). In this way, the light-filtering assembly 110 is configured to cast (project) a visible light pattern having a projected shadow region 112 and a projected glow region 114 onto the projection-receiving surface 900 (as depicted in FIG. 3C).

It will be appreciated that the image depicted on the projection-receiving surface 900 may be produced with or without the lens assembly 118. In addition, it will also be appreciated that the image depicted (projected) on the projection-receiving surface 900 includes several instances of the projected shadow region 112 and several instances of the projected glow region 114.

In accordance with an embodiment, the light source 108 includes an LED strip 109 (also called an RGB strip or a light emitting diode strip) having instances of a light emitting diode (such as, a first light emitting diode 107A, a second light emitting diode 107B, and a third light emitting diode 107C) spaced apart from each other (preferably, also positioned along a linear row). Preferably, each LED is configured to emit a red light, a green light and a blue light (different coloured lights). Generally, the LED strip 109 is configured to transmit different coloured lights (such as, red light, green light and blue light). The instances of the red light, green light and blue light emitted by each of the light emitting diode (LED) in combination with the light-filtering assembly 110 cooperate to form visible coloured fringes on the image or pattern to be projected onto the projection-receiving surface 900. In addition, there are different shadows associated with each instance of the light emitting diode (LED). In use, the LED strip 109 shines through the light-filtering assembly 110 that is made to rotate, resulting in a projection of colourful rotating patterns onto the projection-receiving surface 900. It will be appreciated that the variable coloured fringes are associated with the red light, green light and blue light emitted by each light emitting diode, and the visible fringes appear on (with) the projected shadow region 112 and projected glow region 114 resulting from the spaced-apart light emitting diodes.

In accordance with an embodiment, the projected shadow region 112 and the projected glow region 114 includes multiple instances of overlapping projected shadow regions and projected glow regions (one given by each instance of the light-emitting diodes). It will be appreciated that the three instances of the light emitting diode create partially or wholly overlapping projected shadow regions and projected glow regions.

In accordance with an embodiment, the filter-moving assembly 116 includes a rotatable mechanism 115, such as the type used or deployed in a continuous motion quartz clock (powered by a single AA size battery), or any silent operating motor (electric motor). For instance, the rotatable mechanism 115 may include a wind-up spring and gear mechanism (if so desired). For instance, the rotatable mechanism 115 is configured to rotate the light-filtering assembly 110 at a rotating speed of about one RPM (revolutions per minute). A relatively slower speed of the rotating imagery may have a calming or soothing effect (for the observer placed in a relatively darker environment). It will be appreciated that a control knob may be provided for the rotatable mechanism 115, and may be configured to control or adjust the rotating speed of the rotatable mechanism 115.

In accordance with an option, the lighting apparatus 100 further includes a light controller 120 configured to be coupled to the light source 108 (via a control wire 122). Generally, the light controller 120 is configured to control the amount of a type of light emitted by the light source 108. Specifically, the light controller 120 is configured to control the RGB (Red Blue Green) components of the light source 108 (such as, to control the amount of light that is emitted, etc.). Preferably, the light controller 120 is configured for manual control (via manually-operated potentiometers, etc., and any equivalent thereof) by a user 902, or is configured for automatic control by a micro-controller (known and not depicted). The light controller 120 is configured to enhance the display of the image on the projection-receiving surface 900 by adjustment of image contrast, image intensity, and/or colour saturation (etc.). As depicted in FIG. 3A, the light controller 120 includes a first potentiometer 121A, a second potentiometer 121B and a third potentiometer 121C. The first potentiometer 121A is configured to control the red light content of the light source 108. The second potentiometer 121B is configured to control the green light content of the light source 108. The third potentiometer 121C is configured to control the blue light content of the light source 108. In this manner, the user 902 may select (find) the RGB (red, green, blue) values (in an interactive manner) to control the type of light emitted by the LED strip 109 in such a way that the image projected onto the projection-receiving surface 900 exhibits desired wave interference patterns (also called the projected image). The projected image (depicted in FIGS. 3B and 3C) may be tuned (controlled) using the light controller 120. The light controller 120 is configured to refine the detail in the projected image.

FIG. 3B and FIG. 3C depict schematic views of an embodiment of a projected shadow region 112 and an embodiment of a projected glow region 114 formed by the lighting apparatus 100 of FIG. 1.

The light-filtering assembly 110 (as depicted in FIG. 3A) is configured to control an aspect (such as, the shape and/or the amount) of light that is emitted (transmitted) by the light source 108. In general terms, the light-filtering assembly 110 is configured to produce a pattern of light and shadow on the projection-receiving surface 900 (as depicted in FIG. 3B and/or FIG. 3C).

Referring to the embodiment as depicted in FIG. 3B, a projected image 800 is cast onto the projection-receiving surface 900. The projected image 800 includes a background shadow image 802 (generally associated with the light emitted by the light source 108), a first orb image 804A (associated with the first light emitting diode 107A), a second orb image 804B (associated with the second light emitting diode 107B), and a third orb image 804C (associated with the third light emitting diode 107C).

Referring to the embodiment as depicted in FIG. 3C, the light-filtering assembly 110 is configured to block the transmission of a first amount of light being emitted by the light source 108 through the projection opening 106 towards the projection-receiving surface 900 in such a way that the blocked transmission of the first amount of light being emitted by the light source 108 forms a projected shadow region 112 (as depicted in FIG. 3C) positioned on the projection-receiving surface 900.

Referring to the embodiment as depicted in FIG. 3C, the light-filtering assembly 110 is also configured to permit the transmission of a second amount of light being emitted by the light source 108 through the projection opening 106 towards the projection-receiving surface 900 in such a way that the transmission of the second amount of light being emitted by the light source 108 forms a projected glow region 114 (as depicted in FIG. 3C) positioned on the projection-receiving surface 900.

The filter-moving assembly 116 is configured to move (such as, rotate) the light-filtering assembly 110. This is done in such a way that the projected shadow region 112 and the projected glow region 114 positioned on the projection-receiving surface 900 move and combine to form a variable curved wave pattern while the light-filtering assembly 110 is moved just so.

In accordance with a specific option, the variable curved wave pattern includes curvilinear patterns and wave-interference patterns. In accordance with a specific option, the variable curved wave pattern includes a warping, curving, twisting, entangling, intertwining and enfolding pattern of the projected shadow region 112 and the projected glow region 114. In accordance with a specific option, the variable curved wave pattern mimics (provides or includes) a flowing liquid light pattern. The flowing liquid light pattern includes (in accordance with an option) a liquid-like wave pattern that appears to be moving, in continuous motion. Under some circumstances, the liquid-like wave pattern may appear to provide wave-like non-stationary wave-interference patterns.

The light controller 120 is configured to facilitate enhancing of the projected image cast onto the projection-receiving surface 900 (as depicted in FIG. 3C). For the case where light emitting diodes emit visible colours (such as, red light, green light and blue light), coloured fringes are visible on the image elements owing to (as a result of) separation of the red light source, the green light source and the blue light source on each individual instance of the light emitting diodes (107A, 107B, 107C). By varying the intensity of the red light, the green light and the blue light, the light controller 120 assists the user to adjust intensity to find (select) the colour balance in which greater (improved) contrast may be found (realized) for the image elements that are displayed. The light controller 120 is configured to facilitate colour-component adjustment (RGB adjustment) to provide brightness control, colour control, and/or resolve desirable visual effects through contrast enhancement of the projected image (pattern). The light controller 120 is configured to minimize the contrast, intensity and/or to enhance image contrast, colour and/or intensity (in any combination and/or permutation thereof). By selecting (determining) the amount and/or intensity of the colour-type attributes (such as, the RGB values), the projected image (and therefore this arrangement may produce a relatively stronger wave interference pattern in the projected image). With careful adjustment of the colour attributes, the entire image may be made to move, or swell and shrink (to change shape and/or position). The projection image can be made to roll and bob lazily in the manner of a liquid (non-stationary waves appearing in a liquid-like display) and exhibit subtle wave interference patterns.

FIG. 4A depicts a schematic view of an embodiment of the lighting apparatus 100 of FIG. 1.

In accordance with the embodiment as depicted in FIG. 4A, a lens-positioning adjustment device 130 is configured to be positioned between the lens assembly 118 and the housing assembly 102. The lens-positioning adjustment device 130 may be called a riser, a cylinder or a height adjusting device. The lens-positioning adjustment device 130 is configured to move (raise or lower) the lens assembly 118 relative to the housing assembly 102. It will be appreciated that as the lens assembly 118 is raised or lowered, the scale and size of the projected image may change accordingly.

In accordance with the embodiment as depicted in FIG. 4A, the lens assembly 118 includes a first lens 124 and a second lens 126 positioned relative to the first lens 124.

FIG. 4B depicts a schematic view of an embodiment of a projected shadow region 112 and an embodiment of a projected glow region 114 formed by the lighting apparatus 100 of FIG. 1.

As a result of the lens assembly 118 having the first lens 124 and the second lens 126 (as depicted in FIG. 4A), the projected image 800 further includes a fourth orb image 808A, a fifth orb image 808B, and a sixth orb image 808C. The fourth orb image 808A is associated with the second lens 126 and the first light emitting diode 107A. The fifth orb image 808B is associated with the second lens 126 and the first light emitting diode 107A. The sixth orb image 808C is associated with the second lens 126 and the first light emitting diode 107A.

FIG. 5A depicts a schematic view of an embodiment of the lighting apparatus 100 of FIG. 1.

Referring to the embodiment as depicted in FIG. 5A, the lens assembly 118 includes the first lens 124, the second lens 126 (positioned relative to the first lens 124), and a third lens 128 (positioned relative to the first lens 124). Each lens has a different size, shape, radius of curvature, refractive index, etc.

FIG. 5B depicts a schematic view of an embodiment of a projected shadow region 112 and an embodiment of a projected glow region 114 formed by the lighting apparatus 100 of FIG. 1.

As a result of the lens assembly 118 having the first lens 124, the second lens 126 and the third lens 128, the projected image 800 further includes a seventh orb image 810A, an eighth orb image 810B and a ninth orb image 810C. The seventh orb image 810A is associated with the third lens 128 and the first light emitting diode 107A. The eighth orb image 810B is associated with the third lens 128 and the first light emitting diode 107A. The ninth orb image 810C is associated with the third lens 128 and the first light emitting diode 107A.

Figure 6B:
FIG. 6B (SHEET 6 of 6 SHEETS) depict a schematic view of an embodiment of a projected shadow region and an embodiment of a projected glow region formed by the lighting apparatus of FIG. 1.
Figure 6A:
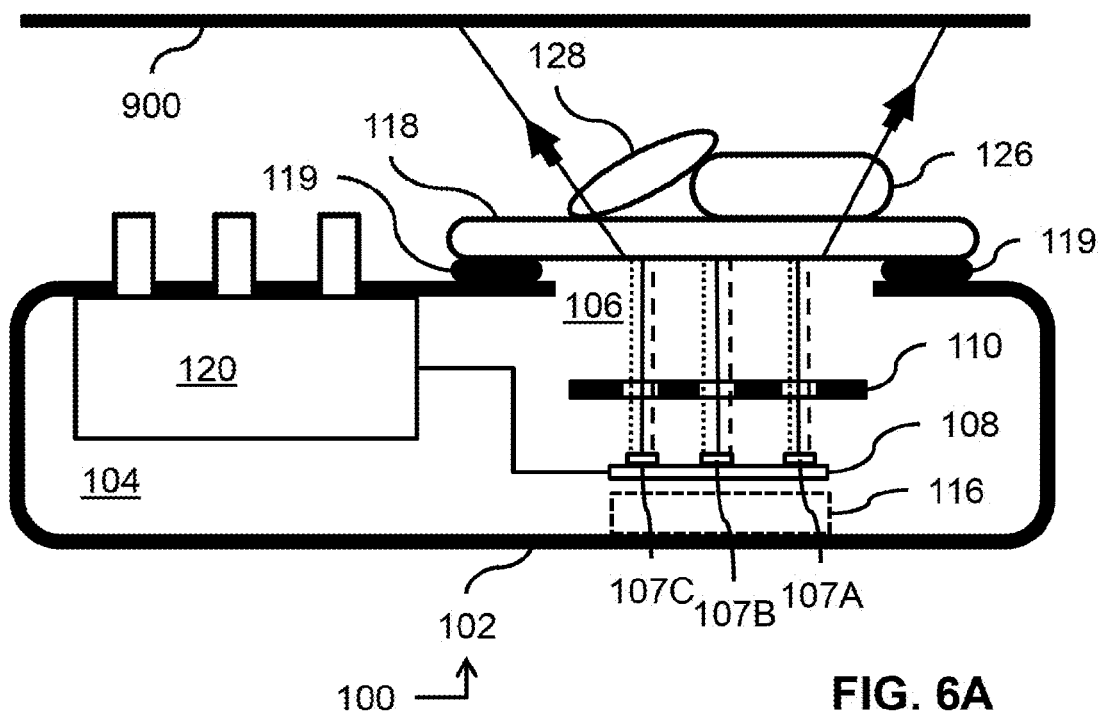
FIG. 6A (SHEET 6 of 6 SHEETS) depicts a schematic view of an embodiment of the lighting apparatus of FIG. 1.

FIG. 6A depicts a schematic view of an embodiment of the lighting apparatus 100 of FIG. 1.

Referring to the embodiment as depicted in FIG. 6A, the lens assembly 118 includes the first lens 124, the second lens 126 and the third lens 128. The arrangement of the lenses of FIG. 6A is different than the arrangement of the lens depicted in FIG. 5A.

FIG. 6B depicts a schematic view of an embodiment of a projected shadow region 112 and an embodiment of a projected glow region 114 formed by the lighting apparatus 100 of FIG. 1.

The rotating of the first lens 124, the second lens 126 and the third lens 128 causes distortion of the projected orbs (formed in the projected image 800). The shadow elements are strongly distorted and also exhibit wavelike elements.

This written description uses examples to disclose the invention, including the best mode, and also to enable any person skilled in the art to make and use the invention. The patentable scope of the invention is defined by the claims, and may include other examples that occur to those skilled in the art. Such other examples are within the scope of the claims if they have structural elements that do not differ from the literal language of the claims, or if they include equivalent structural elements with insubstantial differences from the literal language of the claims.

It may be appreciated that the assemblies and modules described above may be connected with each other as required to perform desired functions and tasks within the scope of persons of skill in the art to make such combinations and permutations without having to describe each and every one in explicit terms. There is no particular assembly or component that may be superior to any of the equivalents available to the person skilled in the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for this document, that the phrase "includes" is equivalent to the word "comprising." The foregoing has outlined the non-limiting embodiments (examples). The description is made for particular non-limiting embodiments (examples). It is understood that the non-limiting embodiments are merely illustrative as examples.

What is claimed is:

1. A lighting apparatus for use with a projection-receiving surface, the lighting apparatus comprising:
   a housing assembly forming an interior housing chamber, and the housing assembly also forming a projection opening leading to the interior housing chamber, and the projection opening being configured to face the projection-receiving surface once the housing assembly is positioned to do just so;
   a light source being positioned in the interior housing chamber of the housing assembly, and the light source being configured to emit light through the projection opening of the housing assembly toward the projection-receiving surface once the light source is positioned and activated to do just so;
   a light-filtering assembly being positioned in the interior housing chamber of the housing assembly between the projection opening and the light source, and the light-filtering assembly being configured to:
   (A) block transmission of a first amount of light being emitted by the light source through the projection opening towards the projection-receiving surface in such a way that blocked transmission of the first amount of light being emitted by the light source, in use, forms a projected shadow region positioned on the projection-receiving surface; and
   (B) permit transmission of a second amount of light being emitted by the light source through the projection opening towards the projection-receiving surface in such a way that transmission of the second amount of light being emitted by the light source, in use, forms a projected glow region positioned on the projection-receiving surface; and
   a filter-moving assembly being positioned in the interior housing chamber of the housing assembly, the filter-moving assembly being coupled to the light-filtering assembly, and the filter-moving assembly being configured to move the light-filtering assembly in such a way that the projected shadow region and the projected glow region positioned on the projection-receiving surface move and combine to form a variable curved interference pattern while the light-filtering assembly is moved just so; and a light controller being configured to be coupled to the light source via a control wire, and the light controller also being configured to control an amount of a type of light emitted by the light source; and the light controller being configured to facilitate focusing of a projected image to be casted onto the projection-receiving surface.

2. The lighting apparatus of claim 1, wherein:
the filter-moving assembly is configured to rotate the light-filtering assembly.

3. The lighting apparatus of claim 1, wherein:
the light-filtering assembly and the filter-moving assembly cooperate to manipulate a shape of emitted light to be projected onto the projection-receiving surface.

4. The lighting apparatus of claim 1, wherein:
the filter-moving assembly includes a rotatable shaft that is fixedly attached to the light-filtering assembly.

5. The lighting apparatus of claim 1, wherein:
the filter-moving assembly includes an electric motor configured to rotate the light-filtering assembly.

6. The lighting apparatus of claim 1, further comprising:
a lens assembly configured to be positioned relative to the projection opening of the housing assembly.

7. The lighting apparatus of claim 6, further comprising:
a lens-support device positioned on the housing assembly proximate to the projection opening, and the lens-support device is configured to support the lens assembly relative to the projection opening.

8. The lighting apparatus of claim 1, wherein:
the light-filtering assembly includes any one of a physical stencil and a slotted template.

9. The lighting apparatus of claim 6, wherein:
the light-filtering assembly is positioned between any one of:
the lens assembly and the light source; and
the light-filtering assembly and the light source.

10. The lighting apparatus of claim 1, wherein:
the light source includes a light emitting diode strip having instances of a light emitting diode spaced apart from each other.

11. The lighting apparatus of claim 10, wherein:
the light emitting diode strip is configured to transmit different coloured lights.

12. The lighting apparatus of claim 1, wherein:
the filter-moving assembly includes a rotatable mechanism.

13. The lighting apparatus of claim 1, wherein:
the light controller is configured for manual control via manually-operated potentiometers.

14. The lighting apparatus of claim 1, wherein:
the variable curved interference pattern includes curvilinear patterns and wave-interference patterns.

15. The lighting apparatus of claim 1, wherein:
the variable curved interference pattern includes a flowing liquid light pattern.

16. The lighting apparatus of claim 6, further comprising:
a lens-positioning adjustment device configured to be positioned between the lens assembly and the housing assembly, and wherein the lens-positioning adjustment device is configured to move the lens assembly relative to the housing assembly.

17. The lighting apparatus of claim 6, wherein:
the lens assembly includes any one of:
a first lens; and
a second lens positioned relative to the first lens.

18. The lighting apparatus of claim 1, further comprising:
a lens assembly configured to be positioned relative to the projection opening of the housing assembly;
a lens-support device positioned on the housing assembly proximate to the projection opening, and the lens-support device is configured to support the lens assembly relative to the projection opening; and
a lens-positioning adjustment device configured to be positioned between the lens assembly and the housing assembly, and wherein the lens-positioning adjustment device is configured to move the lens assembly relative to the housing assembly.

19. The lighting apparatus of claim 1, wherein:
the light controller is configured to control amounts of coloured light that are emitted from the light source in such a way that coloured fringes are visible, on the projected image to be cast onto the projection-receiving surface, as a result of a separation of the coloured light; and
the light controller is configured to facilitate colour-component adjustment to provide brightness control, colour control, and resolve visual effects through contrast enhancement of the projected image to be cast onto the projection-receiving surface; and
the light controller is configured to change the projected image to produce a relatively stronger wave interference pattern in the projected image in such a way that the projected image is made to change shape and position in a manner of non-stationary waves appearing in a liquid-like display and exhibit wave interference patterns.

20. The lighting apparatus of claim 1, wherein:
the light controller is configured for manual control via manually-operated potentiometers; and
the manually-operated potentiometers are configured to select a red light content, a green light content, and a blue light content in an interactive manner to control a type of light emitted by the light source in such a way that the projected image, in use, exhibits interference patterns.

* * * * *